US006260412B1

(12) United States Patent
Pool et al.

(10) Patent No.: US 6,260,412 B1
(45) Date of Patent: Jul. 17, 2001

(54) UNIVERSAL ELECTRONIC FUEL INJECTION SYSTEM TESTING DEVICE

(75) Inventors: James L. Pool, Clarinda, IA (US); Gerard R. Plendl, Mayer, MN (US)

(73) Assignee: Lisle Corporation, Clarinda, IA (US)

( * ) Notice: Subject to any disclaimer, the term of this patent is extended or adjusted under 35 U.S.C. 154(b) by 0 days.

(21) Appl. No.: 09/275,494

(22) Filed: Mar. 24, 1999

(51) Int. Cl.[7] .................................................... G01M 15/00
(52) U.S. Cl. ............................................................ 73/119 A
(58) Field of Search ................................... 73/116, 117.2, 73/117.3, 119 A; 340/438, 439

(56) References Cited

U.S. PATENT DOCUMENTS 3,875,792 * 4/1975 Krohn et al. ....................... 73/119 A
5,107,701 * 4/1992 Smith ................................ 73/119 A

OTHER PUBLICATIONS

"OTC Catalog," Delux Noid Lite Set, No. 3050B, prior to Jul. 21, 1999.

Special TV Tools Web Site (www.jedco–sa.com/specialty–tools.htm) (pp. 1–6) Nov. 5, 2000.*

* cited by examiner

*Primary Examiner*—George Dombroske
(74) *Attorney, Agent, or Firm*—Banner & Witcoff, Ltd.

(57) ABSTRACT

A universal Noid light for testing the output control voltage of an electronic fuel injector system includes a body with a lead wire wound on the body, a resistance light bulb maintained within the body and pins mounted on adjustable pin mounting arms.

11 Claims, 4 Drawing Sheets

UNIVERSAL ELECTRONIC FUEL INJECTION SYSTEM TESTING DEVICE

BACKGROUND OF THE INVENTION

This invention relates to an apparatus for testing the electronic control system for an electronic fuel injection system of an internal combustion engine.

Testing devices for determining whether the fuel injection control system of an internal combustion engine is providing properly timed fuel injection control signals has been, in the past, accomplished by means of a sensor device with lead wires for attachment of the sensor to the electronic control system outlet signal ports for the fuel injector. The starter for the engine is then operated or "cranked" after the sensor is attached to the control system. This causes the fuel injection control system to provide electronic signals through the test sensor. Normal voltage control signals are detected and evaluated by the sensor. Abnormal signals are also detected in this manner.

Heretofore, a version of such testing apparatus, known as a Noid light, was uniquely designed for each make or manufacture of vehicle and/or electronic injection system. Thus, a typical Noid light detection system includes a voltage detector, such as a light bulb, which is connected to the electronic fuel injection control system. If voltage provided to the sensor, e.g., test light, flashes intermittently and regularly, the mechanic concludes that the system is operating properly. However, if the sensor or light does not signal or flash or, for example, does not turn "on" or is "on constantly," then something is defective in the control system and repair or replacement is required.

Numerous types of Noid lights are available in the marketplace, each individually designed for a particular ignition control system and vehicle construction and for compatibility with the wiring harnesses associated therewith. Thus, there has developed a need to provide a simple, more effective and universal device to test the control system for electronic fuel injection systems. Such a need inspired the development of the present invention.

SUMMARY OF THE INVENTION

In a principal aspect, the present invention comprises apparatus for testing the fuel injection control system for any one of a wide variety of internal combustion engine injector systems including a control system for multi-port as well as throttle body type injection systems. The testing apparatus comprises a body which includes a voltage responsive sensor mounted therein and first and second electric leads connected to the sensor. First and second electrical connector pins are connected to the ends of the first and second leads respectively. The pins are mounted in a special adapter which permits adjustment of the spacing of the pins so that the pins may be inserted into outlet ports or sockets associated with any one of a number of fuel injection control systems. Thus, the wiring harness from the engine fuel injectors may be detached from the injection control system, and the pins associated with the testing apparatus connected to the control system outlet ports. The engine may then be "cranked" by operating the starter and simultaneously initiating the output signals of the fuel injector control system. The sensor of the test apparatus, which typically comprises a light bulb, may then be observed to determine whether the fuel injector control system is providing properly timed signals to the engine fuel injectors. A flashing light will typically demonstrate that appropriate signals are being provided.

With the present invention, the spacing of the test apparatus connecting pins is fully adjustable to accommodate insertion of the pins into the outlet ports of any one of a number of fuel injector control systems. Additionally, the connector pins are adapted to receive conductive sleeves so that the pins may be connected to variously sized sockets or outlet ports. The Noid light of the invention or, in other words, the apparatus for testing the fuel injection control system is thus universal and may be used in combination with any fuel injection control system for testing of that system.

The apparatus further includes other features to enhance its universality. For example, the wiring leads may be wrapped up on a spool which is incorporated in the body of the apparatus. The spool may be disassembled to reveal an internal storage compartment and also to permit replacement of the sensor or test bulb. A suction cup is provided on the body to hold the body in position on a vehicle to facilitate its use and observation by a mechanic. The body further includes a molded bracket which allows storage of the adjustable pin spacing adapter. The body also serves as a housing for the light bulb. The housing may be disassembled to permit replacement of the light bulb.

Thus, it is an object of the invention to provide a sensor apparatus which may be used with any one of a number of fuel injection control systems.

It is a further object of the invention to provide sensor apparatus which is lightweight, economical and easy to assemble and disassemble.

Another object of the invention is to provide a Noid light testing apparatus which has an elongated lead wire and a special adapter for connecting lead pins into a fuel injection control system.

Another object of the invention is to provide a Noid light fuel injector control system testing apparatus which includes a lead wire or harness that is elongated and which may be stored temporarily on the apparatus.

A further object of the invention is to provide a housing for the light bulb which permits replacement of the bulb.

Another object of the invention is to provide a fuel injection control system testing apparatus useful for testing control systems for throttle body as well as multi-port injectors.

These and other objects, advantages and features of the invention will be set forth in the detailed description that follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
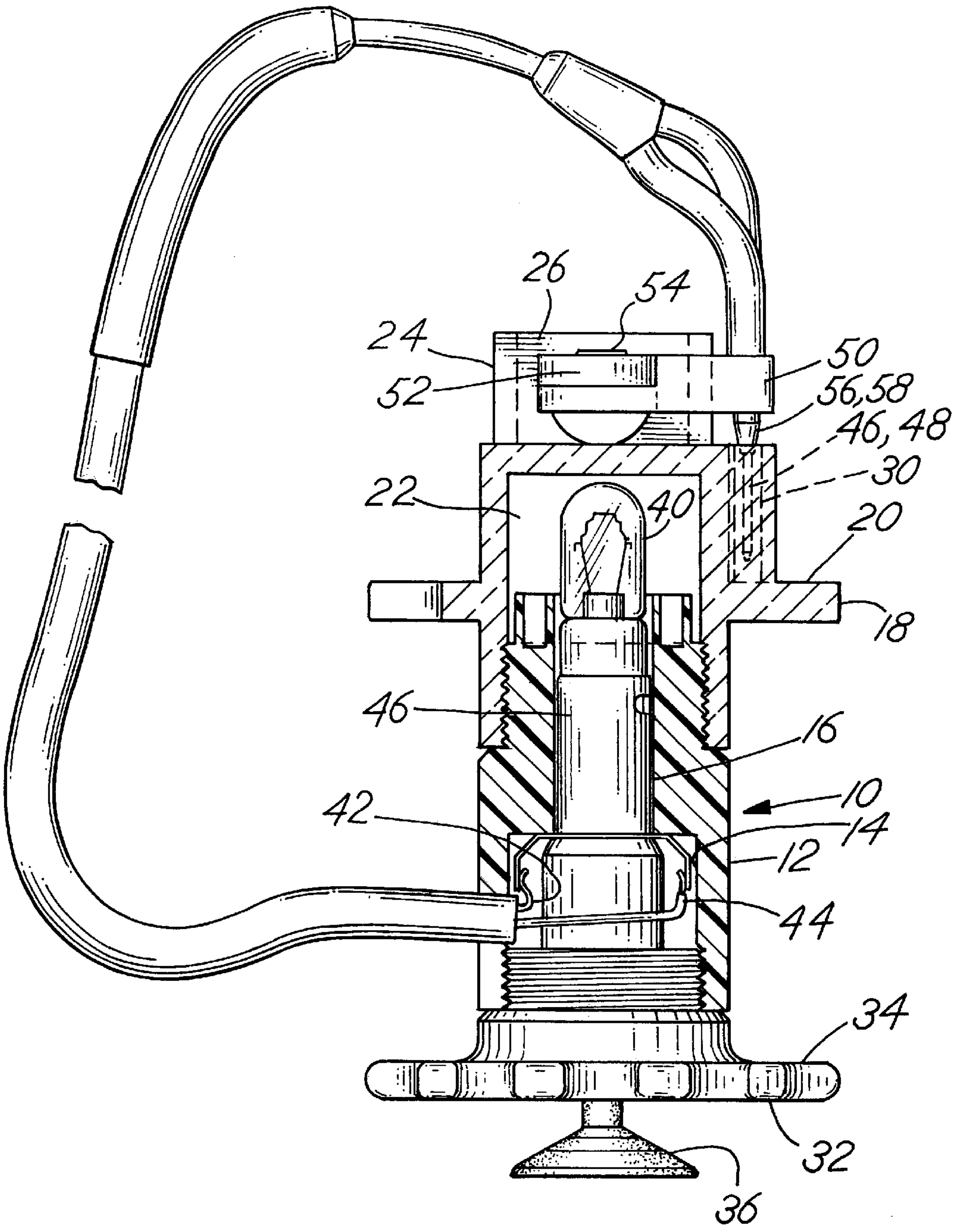
FIG. 1 is a partial cross sectional elevation of the assembled Noid light or testing apparatus of the invention.
Figure 2:
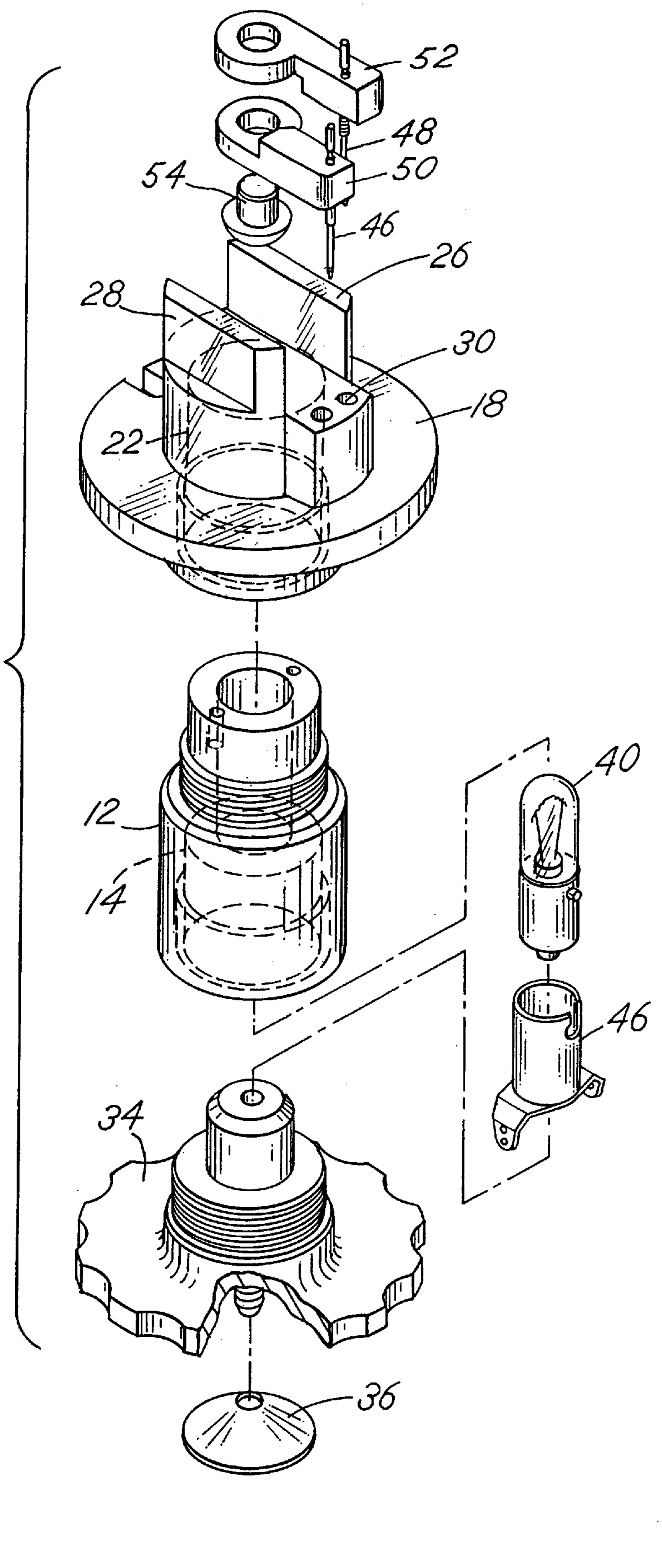
FIG. 2 is an exploded, isometric view of the apparatus of the invention.

Referring to the figures, the Noid light or testing apparatus of the invention is comprised of a molded plastic body 10. The body 10 is comprised of a molded core or cylindrical center member or spool 12 which includes a hollow counterbore 14 and a through passage 16. The spool 12 is threadably inserted into a second part of the body 10, namely a bulb cover 18. The bulb cover 18 includes a flange 20 and a counterbore internal chamber 22. The bulb cover 18 further includes an outer mounting bracket 24 having spaced walls 26 and 28 as well as molded openings or pin receptacles 30 described in further detail below.

The body 10 also includes a molded plastic cap 32 which includes a flange 34. A rubber suction cup 36 is attached to the outside of the flange 34. The cap 32, central spool or core 12 and bulb cover 18 are connected together by threaded connections molded therein. This assembly retains a bulb 40 connected to leads 42 and 44. The bulb 40 is in a socket 46. The socket 46 is retained in the through passage 16 and projects the bulb 40 into the chamber 22. The bulb cover 18 is made of a translucent or transparent molded plastic material so that the lighted bulb 40 is visually observable and may be replaced if necessary.

Figure 3:
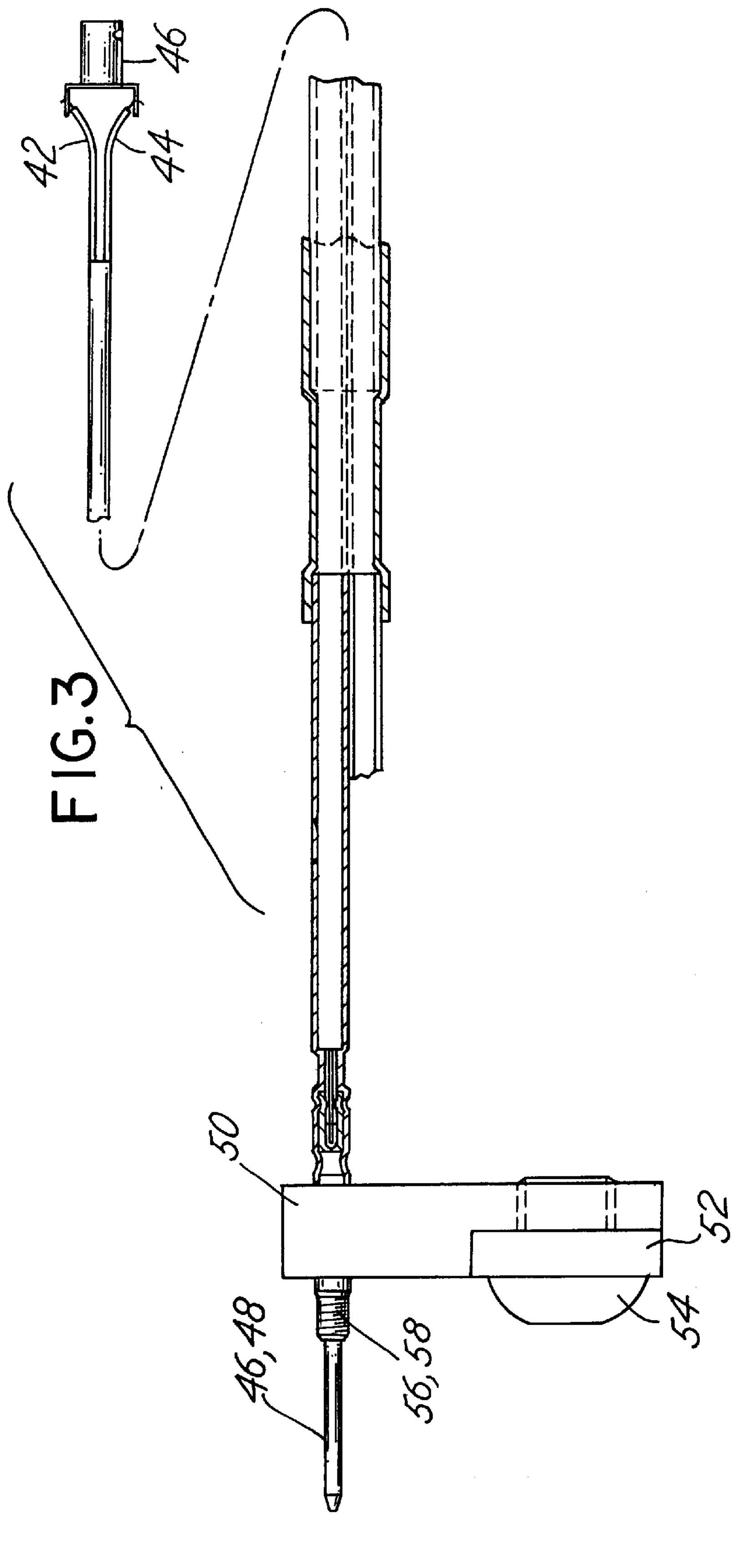
FIG. 3 is an enlarged plan view of a lead wire and adapter associated with the testing apparatus of the invention.
Figure 4:
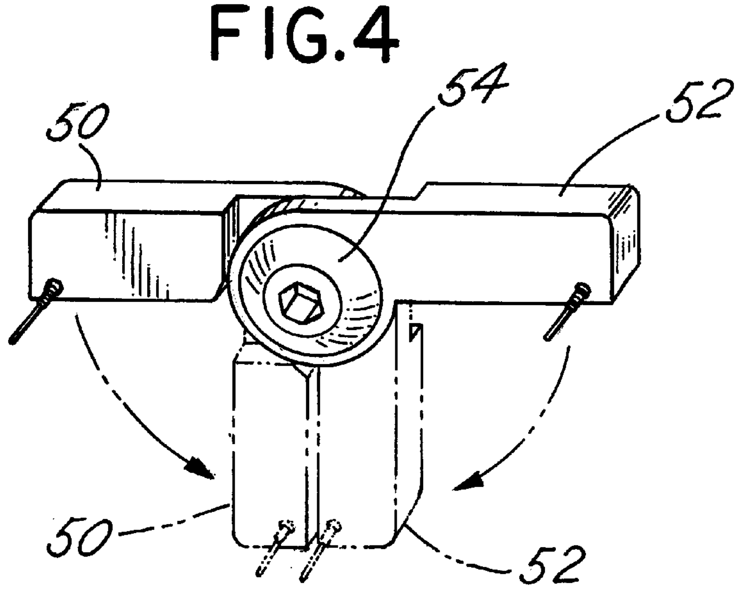
FIG. 4 is an elevation depicting the adapter which includes the connecting pins of the apparatus of the invention and the manner in which the spacing of the pins may be adjusted.

The leads 42 and 44 connect to pins 46 and 48 mounted on arms 50 and 52 respectively. The pins 46 and 48 are mounted respectively on a first end of each of the first and second arms 50 and 52. The opposite end of each of the arms 50 and 52 is connected together by a pivot connection 54. In this manner, the arms 50, 52 may be pivoted as depicted in FIG. 4 to alter the spacing between the pins 46 and 48. The pins 46, 48 may be adjustably spaced to accommodate or fit into injection lead wire sockets associated with various ignition control systems. The pins 46 and 48 further are adapted to receive sleeves 56 and 58 respectively. The sleeves 56 and 58 may be connected by threading onto the pins 46 and 48. Thus the sleeves 56, 58 are designed to fit with various sizes of sockets. FIGS. 3 and 4 illustrate this construction further.

Figure 5:
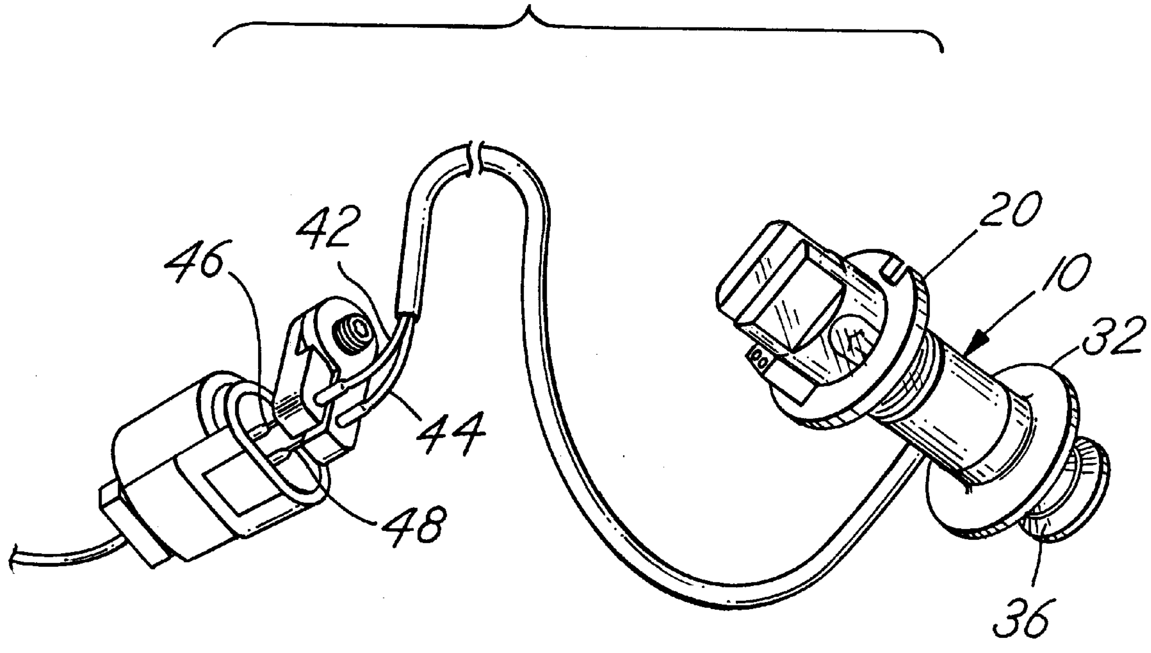
FIG. 5 is an isometric view illustrating the manner in which the testing apparatus of the invention may be attached to the fuel injector control system associated with an internal combustion engine to reveal the operating characteristics of the control system.

As depicted in FIG. 5, the Noid light may be placed on the hood of a car, for example. The lead wires 42 and 44 may then be unwound from the body 10 between the flanges 20 and 32. The spacing of pins 46 and 48 may then be adjusted so that they may be placed into appropriate sockets associated with a fuel injection control system. The engine of the vehicle may then be "cranked" and this will cause the fuel injection control system to provide output signals. If the signals are proper or appropriate, then the light bulb 40 will periodically flash. If there is no flash or if there is a steady light, then the control system is not functioning as designed.

With the construction of the present invention, it is possible to utilize the Noid light or testing apparatus in combination with almost any fuel injection control system currently available in the marketplace. The Noid light of the invention also includes some structural features which enable it to be more universal than many of the prior art alternatives. Thus the lead wires 42, 44 may be wrapped or coiled onto the device. The pins 46 and 48 may be inserted into the bracket openings 30 and maintained between the walls 26 and 28 for storage. The sleeves 56 and 58 may be conveniently stored under the bulb cover 18 in the two holes provided in the body 10.

Various other features and alternative features of the invention may be provided. Thus the invention is to be limited only by the following claims and equivalents thereof.

What is claimed is:

1. Apparatus for testing a fuel injection control system of an internal combustion engine comprising, in combination:

a body, said body including a voltage responsive sensor, first and second leads connected to the sensor; and an adapter, said adapter including a first arm, a second arm, a first connector pin at one end of the first arm, a second connector pin at one end of the second arm, said first arm and said second arm connected at a pivot connection whereby the spacing between the pins is adjustable by pivoting the arms with respect to one another, said first and second leads electrically connected respectively to the first and second pins respectively, said pins being insertable in fuel injector control mechanism pin sockets.

2. The apparatus of claim 1 further including conductive pin sleeves for attachment to the pins to adjust the size of the pin.

3. The apparatus of claim 1 including a suction cup for the body for supporting the body on a vehicle.

4. The apparatus of claim 1 wherein the sensor comprises a bulb.

5. The apparatus of claim 1 including spaced flanges on the body defining a spool for winding the leads.

6. The apparatus of claim 1 wherein the body includes a spool with a center cylinder and spaced flanges for storage of the lead wires.

7. The apparatus of claim 6 wherein the body is comprised of a first element including a first flange, a second element attached to the first and comprising a center cylinder and a third element comprising a second flange spaced from the first flange.

8. The apparatus of claim 6 further including an internal storage chamber in the body for storing pin sleeves.

9. The apparatus of claim 6 including an adapter storage and support bracket on the body for holding the adapter in a storage position.

10. The apparatus of claim 4 or 7 including a replaceable bulb maintained in the body.

11. Apparatus for testing a fuel injection control system of an internal combustion engine comprising, in combination:

a voltage responsive sensor;

first and second leads from the sensor;

an adapter for electrically coupling the leads to conductive sockets of a fuel injection control system, said adapter including first and second pins connected respectively to the first and second leads to provide a circuit between the pins and through the sensor, said adapter further including an adjustable pin support bracket for supporting the pins spaced from one another and adjustment of the spacing of the pins whereby the pins are connectable simultaneously with sockets of a variety of fuel injection control system electrical outlet sockets.

* * * * *